[55.]

Hiram W. Hayden.

Improvement in Lamp Burners.

No. 4,541. Reissued Sep. 5. 1871.

Hiram W. Hayden.

Witnesses,

Chas H. Smith

Geo. Pinckney

Lemuel W. Serrell atty.

AM. PHOTO-LITHOGRAPHIC CO. N.Y. (OSBORNE'S PROCESS.)

UNITED STATES PATENT OFFICE.

HIRAM W. HAYDEN, OF WATERBURY, CONNECTICUT, ASSIGNOR TO HOLMES, BOOTH & HAYDEN, OF SAME PLACE.

IMPROVEMENT IN LAMP-BURNERS.

Specification forming part of Letters Patent No. 106,363, dated August 16, 1870; reissue No. 4,541, dated September 5, 1871.

*To all whom it may concern:*

Be it known that I, HIRAM W. HAYDEN, of Waterbury, in the county of New Haven and State of Connecticut, have invented and made an Improvement in Lamp-Burners; and the following is declared to be a correct description thereof.

Before this invention a lamp-burner had been made with a circular wick-tube and an interior air-tube, the two being connected on one side and the wick passing at each side of this connection, so as to form an Argand lamp. This character of lamp may be seen in Webster and Parks' Encyclopedia of Domestic Economy, page 190.

This invention of mine is intended to facilitate the construction of the burner, lessen its expense, and insure the raising and lowering of the wick with uniformity.

I make use of a tapering exterior wick-tube and a cylindrical, or nearly cylindrical, interior air-tube, and provide an opening for the lateral admission of air to the air-tube. The wick-tube, being larger at its base than at the top, is important, because the lateral opening (which should be of the same size as the central air-tube) takes up considerable space; hence the exterior tube, near the lateral opening, must be as much larger than at the top as the space taken up by the lateral opening, in order to introduce a flat wick sufficiently broad to form a perfect circle at the top of the wick-tube. In the central air-tube is a vertical air-dividing plate, that separates the currents of air and prevents any unsteadiness in the flame; without it, eddies in the currents of air would produce a flickering or movement of the flame. The wick-holder is made of a band, partially or entirely surrounding the wick, with projecting points to penetrate the same and thereby hold the flat wick in a cylindrical form around the central air-tube; and a movable chimney-holder is provided around the wick-tube and above a perforated air-distributer.

By this construction the wick can be entered with facility between the tubes, when the wick-holder is moved to the upper end of the wick-tube and the wick is then drawn through a suitable length, so that when the wick and its holder are moved down in the burner the top of the wick can be trimmed and raised or lowered to regulate the light, and as this length of wick is burned up the wick can be drawn further out from the holder until the same is consumed.

Figure 1:
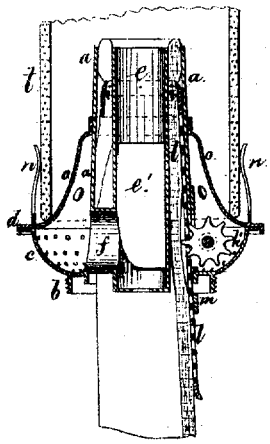
Figure 2:
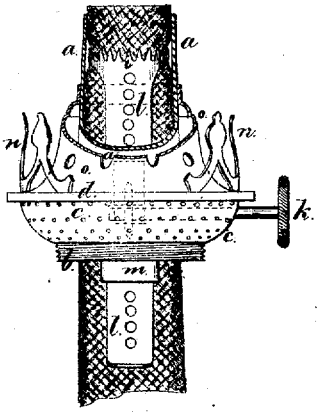

In the drawing, Figure 1 is a vertical section of my improved burner, and Fig. 2 is a partial section at right angles to Fig. 1.

*a* is the exterior wick-tube, of a circular but tapering form, and connected to its lower end is the screw or ring *b*, by which the burner is to be attached to the reservoir. *c* is a perforated or foraminous air-distributer, of suitable size and shape, surrounding the tube *a*, and upon which the chimney-holder *d* rests or is attached. Within the tube *a* is the central air-tube *e*, that is of a cylindrical form, so that there will be a proper space left at the upper ends of the tubes *a* and *e* for the wick, which wick is of a flat form, bent into a cylinder at the upper end of the burner to produce an Argand flame. The interior draught is admitted laterally into the air-tube *e* by a tubular opening or lateral connection at *f*, between the tubes *a* and *e*. Within the air-tube *e* is the plate *e'*, that gives direction to the air and prevents flickering, as aforesaid. The wick-holder *i* is made of a band, partially or entirely surrounding the wick, with projecting points to penetrate the wick and thereby hold the flat wick in a cylindrical form around the air-tube *e*, so that this character of wick in an Argand burner can be kept in a proper shape to be raised or lowered evenly without interfering with the flow of the oil, and at the same time avoid the difficulty heretofore experienced of one edge of the wick becoming higher than the other. This wick-holder *i* is made with a bar, *l*, that is connected, through a slot in the wick-tube *a*, with the mechanism that raises and lowers the wick. I have shown the wheel *h* that operates upon teeth in the bar *l*, and I find that a convenient way of making this rack and pinion is to provide a row of holes in the rack and use pinion-teeth. The rack is to be guided by passing through a slide, *m*. A thumb-wheel, *k*, upon the shaft of the pinion *h*, is employed for actuating the same.

It will now be understood that, when the wick-holder is moved to the top of the burner, the wick can be slipped or pushed up from below and drawn evenly through, within this holder *i*, the proper length, and that this holder will operate to lower or raise the wick with uniformity, and, when consumed down to the wick-holder, the wick can be drawn through another length, as before. By this means the wick will be operated more uniformly than with the screw wick-raiser heretofore used on Argand lamps.

The chimney-holder is shown as formed of a range of clamping-springs, *n*, connected with a tapering perforated guide, *o*, that surrounds the wick-tube *a* and is within the chimney *t*, so that the holder, chimney, and guide *o* can be lifted off the burner to give access to the wick; and when the chimney-holder and guide are in place the air, passing in through the distributer *c*, is divided, a portion going into the air-tube *e* and the remainder passing through holes in guide *o* to supply the external draught to the flame.

I claim as my invention—

1. The wick-holder *i*, with penetrating teeth surrounding and acting to hold the flat wick in a cylindrical form around the central air-tube and above the lateral inlet, and adjust the height of the wick without interfering with the capillary action of said wick, as set forth.

2. The wick-raising mechanism, acting upon the exterior of the flat wick within the tube *a* and above the lateral inlet *f*, in combination with the interior air-tube *e* and exterior tapering tube *a*, substantially as and for the purposes set forth.

3. The wick-holder *i* with its bar *l* interposed between the flat wick and the tapering tube *a*, in combination with the tapering tube *a*, air-tube *e*, lateral inlet *f*, and the wick-raising mechanism acting upon the said bar *l* through a slot in the said tube *a*, substantially as set forth.

4. The tapering perforated guide *o* and spring chimney-holder *n*, constructed substantially as specified, and combined with the foraminous air-distributer *c* that supports the removable spring chimney-holder and guide when in place, substantially as set forth.

Signed by me this 5th day of June, A. D. 1871.

H. W. HAYDEN.

Witnesses:

A. S. CHASE,

JAS. M. ABBOTT.